United States Patent [19]

Brummett et al.

[11] 4,048,281

[45] Sept. 13, 1977

[54] METHOD OF ASSEMBLING PLASTIC WRAP ON A GLASS CONTAINER

[75] Inventors: Marshall G. Brummett, Toledo; Russell W. Heckman, Perrysburg; George A. Nickey; James E. Taylor, both of Toledo, all of Ohio

[73] Assignee: Owens-Illinois, Inc., Toledo, Ohio

[21] Appl. No.: 658,651

[22] Filed: Feb. 17, 1976

[51] Int. Cl.² ............................................. B29C 27/20
[52] U.S. Cl. ..................................... 264/230; 156/86; 156/497; 264/249; 264/342 R
[58] Field of Search ....................... 264/230, 342, 249; 156/86, 497

[56] References Cited

U.S. PATENT DOCUMENTS

| | | | |
|---|---|---|---|
| 3,389,530 | 6/1968 | Yates | 264/342 R |
| 3,523,052 | 8/1970 | Bolen | 156/86 X |
| 3,629,389 | 12/1971 | Quackenbush | 264/230 X |
| 3,959,065 | 5/1976 | Ashcroft | 156/86 X |

*Primary Examiner*—Richard R. Kucia

*Attorney, Agent, or Firm*—J. R. Nelson

[57] ABSTRACT

There is disclosed a method of covering glass containers with a preformed, cylindrical sleeve of a polyethylene or like polyolefin material, or laminates of polyolefins, that are heat shrinkable circumferentially of the sleeve and made from sheet of a foam or a laminate of said plastic material such as a foam-film laminate. Upon application of heat, the sleeve initially softens or becomes limp, and grows or enlarges, such that in its telescopic assembly on the upright bottle it tends to slip from position. The method includes supporting the sleeve from underneath during heating it for shrinkage by conveying the container and sleeve over a water-cooled sleeve support bar extending into the heating device a substantial distance allowing the sleeve to shrink onto the bottle. The sleeve support bar includes a lubricious surface layer adjacent the sleeve. The lubricious layer combined with water cooling maintains support surface below 200° F, preferably below 150° F, and prevents sticking of the plastic on the support.

7 Claims, 4 Drawing Figures

METHOD OF ASSEMBLING PLASTIC WRAP ON A GLASS CONTAINER

The present invention relates to manufacture of plastic shrink wrap coverings on glass containers of the type disclosed in U.S. Pat. No. 3,760,968.

BACKGROUND OF THE INVENTION

In the manufacture of plastic coated containers of the type disclosed in said patent, glass bottles or like containers are preheated or conditioned to temperature above ambient temperature and conveyed in a vertical upright position by a ware handling conveyor which has spaced chucks thereon. The chucks grip the bottles by the neck finish and the conveyor carries them in single file past a sleeve making apparatus. The sleeve making apparatus receives a continuous web of the oriented heat shrinkable plastic, preferably a foam having some stiffness, that has been preprinted with a desired decoration. The machine cuts successive lengths of the material from the web and feeds them to individual mandrels on a rotary turret. Each cut length of the material is wrapped around the periphery of the mandrels so that the leading and trailing ends overlap and the ends are united to form a cylindrical sleeve with its axis disposed vertically. The mandrels move in registered position with containers on the conveyor in an assembly station wherein the conveyor path is in overlying relationship with the path of the underlying mandrels. The sleeves are stripped axially from the mandrels and telescopically placed about the bottle such that a lower end portion overhangs the bottom end of the bottle. In this fashion, the bottle and sleeve are conveyed by the ware conveyor to an oven or like heating device and heated sufficiently to shrink the plastic sleeve snugly and firmly about the exterior of the bottle.

Various devices have been employed to assure the position of the sleeve on the bottle from the time the sleeve is initially assembled until it shrinks. Zonal heat bands have been used with some success, such as is disclosed in the copending application of R. A. Ashcroft, Ser. No. 464,224, filed Apr. 25, 1974 (now U.S. Pat. No. 3,959,065), which is of common ownership with the present application.

SUMMARY OF THE INVENTION

In making plastic wrapped glass containers covered with a polyethylene, or certain other polyolefins, polymers or copolymers as mentioned hereinafter, some difficulty is experienced in zonal heating because of the time and distance available to maintain the assembly of the sleeve on the bottle. Polyethylene materials of the heat shrinkable variety have a tendency under application of heat to first become very limp and actually grow or expand as a sleeve on the bottle just before shrinkage occurs. This tendency causes some or several of the sleeves to slip from position on the bottle in the heating oven, or on the way thereto, such that "off-ware" or rejects result to an intolerable degree.

By the present invention, the sleeves are supported in their path to and into a part of the oven, at least until shrinkage has occurred and proper position of the sleeve shrunken on the bottle is assured. This is accomplished by a support bar set at the correct height, or spacing from the bottoms of the bottles on the conveyor, such that in position as assembled on the bottle, as aforesaid, the lower edge of the sleeves engage and glide over the support bar top surface. This surface is preferably coated with a material to reduce friction and is somewhat rounded to aid in friction reduction. One such low friction coating is "Teflon" and may be applied in several convenient forms, i.e., powder, tape or sprayed-on coating.

Inasmuch as the support for the sleeve must be maintained through a portion of travel of the conveyor for the bottles in the hot atmosphere of the heating device, e.g., an elongated tunnel-type oven open at its opposite ends through which the path of the conveyor travels, the support surface and the support bar will assume the operating temperature of the oven after a time. The ovens are operated at or above 400° F for shrinking polyethylene sleeves onto bottles. This hot surface would render the plastic soft and pliable by contact and result in sticking, whereby the sleeves would become deformed at the lower edge and also result in producing intolerable quantities of off-ware.

It is therefore a very essential feature of the invention to cool the sleeve support surface below such temperature at which sticking takes place. In operating with polyethylene materials, the support bar should be cooled to maintain its temperature below 200° F and preferably below 150° F. As such, the sticking problem is overcome, i.e., by employing low friction coatings on the bar surface and cooling it to these temperatures.

Although various coolant media may be employed, a water cooled support bar is preferred. A pump-sump supply is connected to the bar, which is constructed as a pipe within a pipe and the coolant is circulated continuously internally of the support bar. Refrigeration by cooling coils implanted in the sump may be used as necessary to maintain a supply of the low temperature coolant in a closed system.

Other advantages and features of the invention will be more readily apparent to those skilled in the art from the following detailed description of the drawings, which illustrate apparatus for carrying out the method of the invention, on which:

DESCRIPTION

Figure 4:
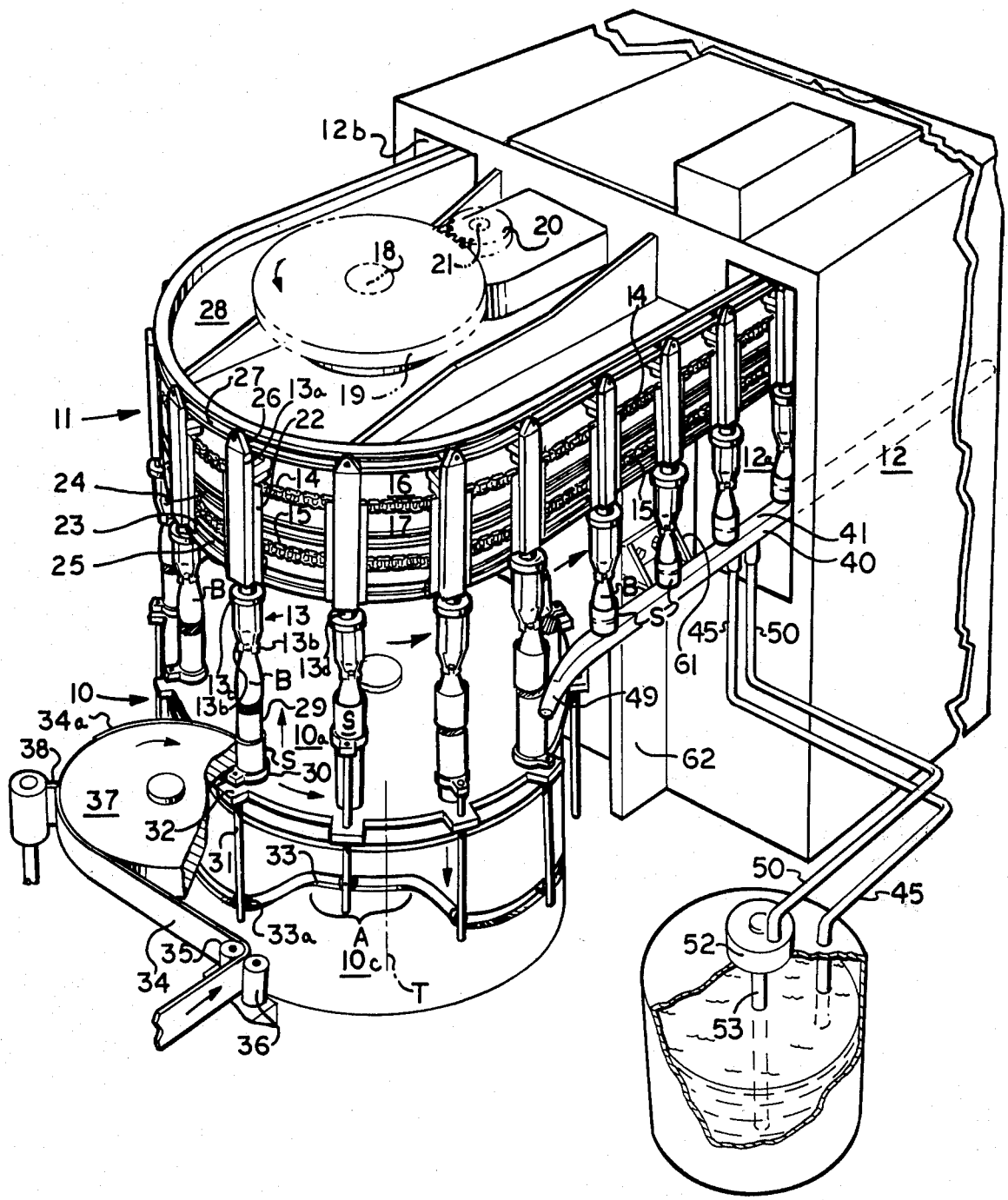
FIG. 4 is a three-quarter front perspective view of the machine for applying polyethylene sleeves onto glass bottles and the heating device for preheating the bottles before receiving the sleeves and the heating device for shrinking sleeves onto the bottles after the two are assembled, including the bottle conveyor, which incorporates the features of the invention for performing the method.

Shown on FIG. 4 is a machine for producing plastic sleeves on a turret machine 10, assembling them telescopically over glass bottles carried by the conveyor 11 and shrinking them thereon in a heating apparatus 12.

Figure 3:
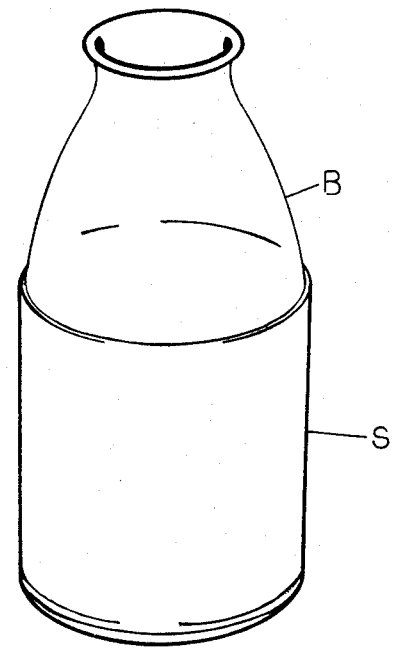
FIG. 3 is a spacial perspective view, partly broken away and sectioned, which is like FIG. 2, illustrating the sleeve shrunken onto the bottle.

The glass bottles B in the examples of the present disclosure, after having a shrunken plastic covering thereon, form a composite container of a type described and shown in the aforementioned U.S. Pat. No. 3,760,968, as shown on FIG. 3.

Again referring to FIG. 4, in production of these containers, glass bottles B are picked up by the neck chucks 13 spaced along the endless bottle conveyor 11 and carried through a heating section 12b of the oven structure 12. After receiving sleeves of the plastic material, as described hereinafter, the conveyor path extends to the tunnel chamber 12a of the heating device 12, enters chamber 12a and extends through the length thereof. The heat chamber 12a of the oven is operated as a circulating hot air chamber or infra-red heaters provide the oven temperature for shrinking the plastic cylinder-like sleeves S onto bottles B.

The plastic material is a polyolefin or copolymers of olefins, for example polyethylene, or laminates of polyolefins, e.g., polyethylene foam layer and polyethylene film or polystyrene foam layer and ethyl acrylate film. The plastic material in sheet form is highly oriented in the longitudinal dimension of the web (circumference of sleeve S) in relation to any orientation of the plastic sheet in its transverse dimension (height of sleeve S). Examples of plastic sheet material that may be run in form of web 34 are foamed polyethylene on the order of 0.008–0.02 inch thickness highly oriented in the running direction of web 34.

In a more general way, the plastic sheet material may be a form of a contractible polyolefin or copolymer of olefins with vinyl esters, for example, vinyl acetate, or with alpha, beta, monoethylenically unsaturated acids, such as ethyl acrylate or ethylene ethyl acrylate. The plastic is preferably in form of a foam sheet or a foam/film laminate sheet. The general property of such materials in contraction (shrinking) is a first pliable, plastic state (very limp condition) at which time the sheet material tends to sag or slump, followed by an almost instantaneous shrinkage reaction. This invention deals with the propensity in the material to slump and grow during the initial stages of heating in the application of the sleeves of the material onto a rigid base article in the production herein described.

Figure 2:
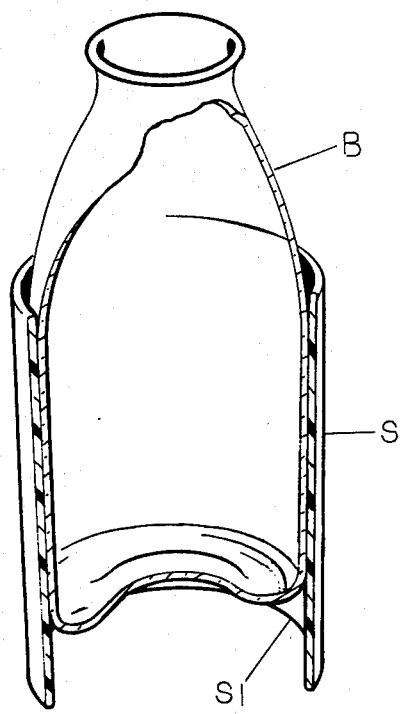
FIG. 2 is a spacial perspective view, partly broken away and sectioned, showing the assembled position of a polyethylene sleeve on a glass bottle during travel with the bottle conveyor into and through part of the oven.

The inner circumference of sleeve S (FIG. 2) is slightly more than the exterior circumference of the bottle B so that the sleeve S may be telescopically applied over bottle B to a desired elevation on the latter. The preferred thermoplastic may be of foamed structure and such a material on the order of ten thousandths of an inch or greater in thickness provides a suitable sleeve S for handling on the machine.

LIQUID-COOLED SLEEVE SUPPORT BAR

Within a short span of travel of the conveyor 11 for bottles beyond the sleeve assembly point, the lower edge S' of the sleeve passes directly over a sleeve support bar 40 which extends in an underlying relationship to bottles B along the path into and through some of the length of the oven. Support bar 40 is supported by its connection on a cantilevered bracket 61 fastened to a vertical structural beam 62 at the front end of the oven 12 and may be adjusted for height on the vertical beam support. The top surface of support bar 40 should be positioned approximately one half inch below the bottom of the bottles B, which is approximately equal to the amount sleeves S overhang the bottom end of the bottles in the assembly position. This overhang dimension assures the sleeve will shrink around the lower corner radius of the bottle and onto the bottom end of the bottle.

Figure 1:
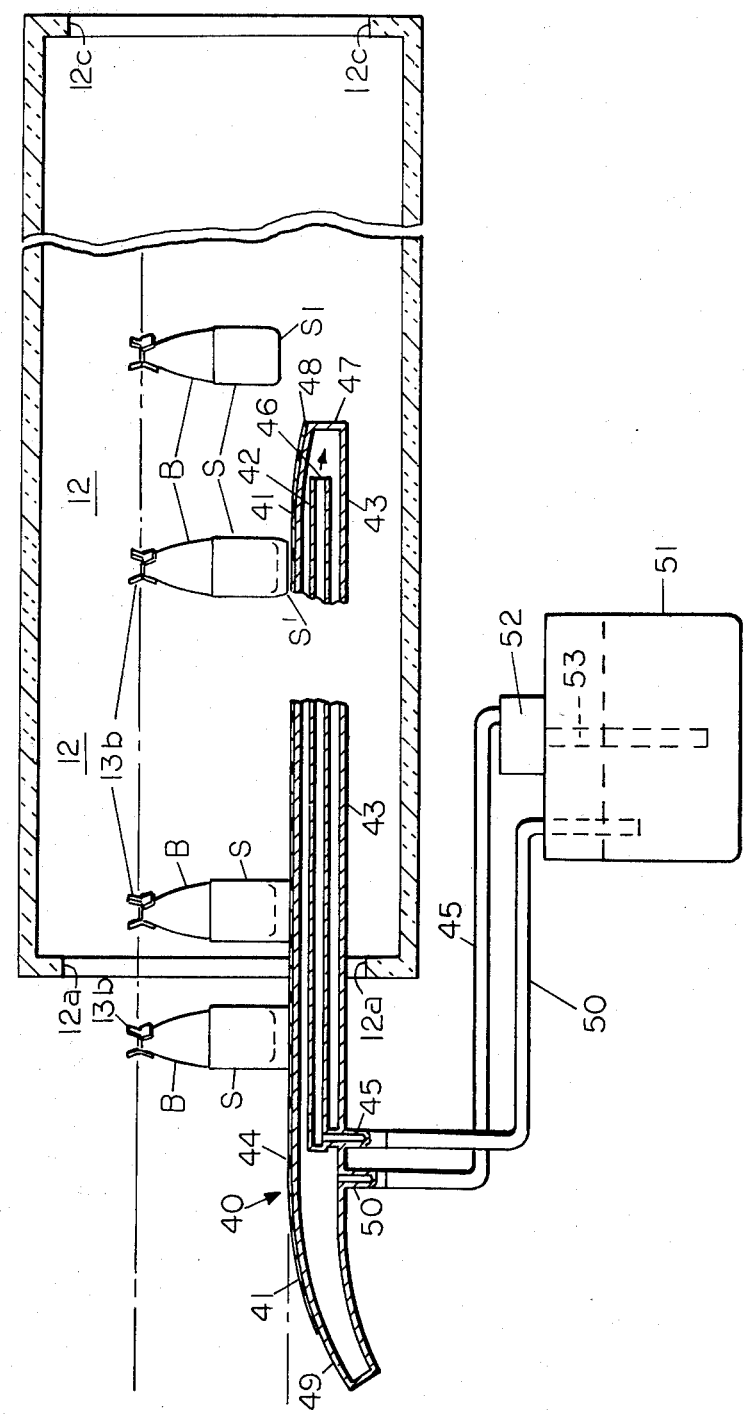
FIG. 1 is a sectional, side elevational view of a tunnel-type oven for shrinking sleeves onto bottles, and includes the sleeve support bar and coolant system of the invention.

Referring to FIGS. 1 and 4, support bar 40 is shown in its relationship with cure oven 12. Bottle conveyor 11, represented by dashed line, extends in a straight line through the length of oven 12. As bottles B enter the oven at its front entrance of chamber 12a, the lower edges S' of the plastic sleeves are supported in position by the telescopic fit on the bottles and assured this position by riding on the top of support bar 40. The cure oven 12 is heated by linearly spaced infra-red burners or hot air to a temperature in the range of 400°–1000° F. The support bar 40 is liquid cooled, as will be presently described, to a temperature below 200° F so as to avoid sticking of the plastic sleeves on the bar surface. The top bearing surface of bar 40 is coated with a lubricious surface layer, an example of which is "Teflon" in the form of a Teflon tape 41 or a thin Teflon surface coating.

The support bar 40 consists of one metal pipe 42 inside another pipe 43. The pipe 42 is closed at its one end 44 and a water outlet pipe 45 is connected thereat. The opposite end 46 of pipe 42 is open and is spaced from the closed end 47 of outer pipe 43. The aft end of pipe 43 may be slightly sloped downwardly at 48. The forward end 49 of pipe 43 is curved downwardly from the horizontal sleeve support plane (shown in dotted line extension) for providing a gentle camming action in the engagement of the support bar with the sleeves S. The outer pipe 43 is curved at forward end 49 in the horizontal plane to fit into position at turret 10a and avoid interference with mandrels 29 thereon (FIG. 4). Adjacent the curved forward end portion 49 of pipe 43 is a water inlet pipe 50 connected thereto. The preferred liquid coolant is water, although other liquid coolants may be substituted in the system. Liquid coolant is supplied from tank 51 into pipe 50 by pump 52 having a snorkel feed pipe 53 in the liquid. The pump may be an electric motor driven pump assembly of conventional type. The outlet of pump 52 is connected to the inlet pipe 50 for the outside pipe 42 of the apparatus. Liquid is pumped into pipe 43, along the length thereof, cooling the outside pipe and coating to an operating temperature. Spent coolant enters the far open end 46 of inner pipe 42 for returning used coolant to the tank. Circulated coolant is drained through outlet pipe 45 and back to the tank 51 for recirculation by pump 52.

The length of the support bar 40 should be long enough to extend from its outer sloped end 49 near the turret machine 10 to and into oven 12 a sufficient extent to allow for oven heat to shrink the sleeve S substantially or enough to grip the bottle firmly. Usually, this requires the sleeve S to traverse approximately one half of the length of the oven, shown on FIG. 1. The oven length extends from the entrance opening 12a to the exit opening at 12e. At the time bottle B and sleeve S thereon are conveyed away from the turret path of the turret machine 10 (FIG. 4), the bottle and sleeve assembly are conveyed directly over the top of support bar 40. In the initial stages of travel toward and into the oven 12, (before shrinking of the plastic sleeve takes place) the bottom edge S' of the sleeve S rides over the reduced friction top surface 41 of the support bar. At a later stage of travel inside oven 12, the plastic will shrink; whereupon, the edge S' of the sleeve will raise onto the bottle bottom such as is shown by the bottle at the right hand side of FIG. 1.

In the present invention, the sleeve support bar apparatus remains cool so that the thermoplastic sleeves do not stick on the bar as they move thereover, plus the support bar is designed with the coolant inlet pipe encircling the coolant outlet pipe, so as to be very compact and versatile in operation. The preferred circulation is that shown; however, the inlet and outlet pipes may be switched at the pump and tank reversing the circulation. This cooling arrangement will operate best by having the fresh cooling liquid supplied to the outside pipe (as shown) which provides faster cooling of the surface 41.

The support bar extends into the middle of the oven and therefore would become extremely hot if not cooled. Because some species of polyolefin materials shrink more slowly in relation to production speeds of the assembly machinery, it is necessary to support the sleeves into the oven at least until substantial shrinkage of the material takes place so as to hold the sleeves firmly in place on the container. To facilitate service and operation of the support bar, the disclosed cantilevered support thereof from the single bracket located outside the oven chamber is important.

THE MACHINE

The bottles B are fed to and loaded on the neck gripping overhead chucks 13 connected to an endless driven carriage comprised of upper and lower chains 14 and 15, respectively, extending around end-turn gears 16 and 17 each keyed onto the vertical shaft 18. A bull gear 19 is also connected at the upper end of shaft 18 in mesh with drive gear 20 connected to the power drive means (not shown) by the drive shaft 21. Power is transmitted to gear 19 to rotate it and shaft 18 counter-clockwise on FIG. 4 and drive the chains 14, 15 in a counter-clockwise direction through the endless path of the conveyor. Chucks 13 are mounted on carriage brackets 22 connected to links of the chains 14, 15. The several carriage brackets have spaced rollers 23 on their back sides running in stationary tracks 24 and 25 around the path of the conveyor. The chucks 13 are each vertically, slidably mounted on their respective carriage brackets 22 and the vertical elevation of chucks 13 is controlled by the cam roller 26 rotatably connected on the upper element 13a of the chuck running in cam track 27 fastened rigidly on the machine. The chucks 13 have three lower jaws 13b which open and close about the top end of bottle B. The jaws 13b are attached to a circular arbor including a wheel element 13c that is rotatable about shaft 13d of the chuck so that friction engagement of the periphery of the wheel element 13c of the arbor with a stationary element (to be described hereinafter) anywhere along the path of the conveyor imparts rotation of the chucks and bottles thereon about the axis of the shaft 13d.

The end-turn portion of the conveyor mechanism is supported by the upper frame 28 rigidly supported on the front wall of the oven 12.

Beneath the conveyor end-turn portion, just described, is the rotary sleeve turret 10 which is coaxial with the vertical shaft 18. Turret machine 10 is comprised of an upper annular turret 10a rotated counter-clockwise about shaft 10b over the lower stationary frame 10c.

The turret machine 10 includes a plurality of spaced mandrels 29 mounted on turret 10a whose peripheral spacing on turret 10a coincides radially and with the peripheral spacing of chucks 13 in the end-turn portion of the conveyor path. The chucks 13 have their centers in registry with the vertical central axes of underlying mandrels 29. At the base of each mandrel in an inactive position there is an annular, encircling push-up bar or stripper element 30 connected onto a vertical operating rod 31 by an arm. Rods 31 are each vertically slidable on the guides 32 connected with turret 10a and under control of the circular cam 33 extending around frame 10c in which a cam roller 33a connected to rod 31 is in running engagement. The cam 33 is a stationary element of turret frame 10c. The pattern of the rise and fall of cam 33 provides the proper vertical reciprocating motion to rod 31 and push-up bar 30 responsive to rotary movement of turret 10a.

Connected for operation with turret machine 10 is mechanism for feeding a supply of plastic strip stock and forming it to sleeve lengths. The strip stock is shown as a running web 34 guided through opposed feed rollers 35, 36 and onto the sleeve drum 37. The web 34 on drum 37 has forward lengths cut therefrom by rotary knife 38, and the cut lengths 34a are held onto drum 37 by vacuum until the leading edge thereof engages a mandrel 29 of turret 10a. The mandrel at this point is engaged by its drive means of the turret machine to rotate it more than 360° winding the strip 34a about a mandrel 29 in an end-to-end overlap of the strip to form a cylindrical shape. Thereafter, means on the turret machine connect the overlapped ends at a vertical seam to complete formation of a cylindrical, hollow sleeve S of the plastic material.

After the plastic strip 34a is wound on mandrel 29 and seamed to form sleeve S, the mandrel 29 and chuck 13 travel together through an assembly station during which the two are at zero angular velocity and displacement with respect to each other. In this span of travel, roller 33a begins its rise on cam 33, and push-up bar 30 rises on mandrel 29, which elevates sleeve S into the telescopic assembly position on bottle B (FIG. 1). Sleeve S is supported thusly by push-up bar 30 during the flat span A of cam 33.

At the point where the cam 33 falls away and push-up bar 30 is retracted, the bottle carriage path diverges tangentially away from the arc path of turret 10a. At this point, the conveyor path coincides with the length of support bar 40 to, into and over part of the length of the oven chamber 12a. The apparatus functions to perform the method described herein, which results in the production of the composite container such as is shown on FIG. 3.

Further modifications may be resorted to without departing from the spirit and scope of the appended claims.

What is claimed is:

1. The method of making a container having an encircling plastic covering thereon comprising conveying containers in line in an upright position along a first path, moving heat shrinkable thermoplastic sleeves in line in an upright position along a second path that includes a portion in underlying axial registry with containers being conveyed along said first path, transferring the registered sleeves to overlie the respective containers while in axial registry in said first and second paths, moving the containers and sleeves thereon in said first path to and through a heating zone wherein the sleeves are sufficiently heated to completely shrink them snugly over the container exterior surface, holding the sleeves in said transferred position while moving the containers and sleeves to and through the heating zone by passing them over a sleeve supporting bar underlying said first path in engagement with the end of said sleeves until they are heated sufficiently to shrink said sleeves annularly and hold the sleeves in said position on the containers, and maintaining the surface of the supporting bar engaging said sleeves at a temperature below 200° F to avoid sticking of the plastic thereon.

2. The method of claim 1, wherein the container comprises a glass container.

3. The method of claim 2, wherein the plastic material comprises a foamed and highly oriented polyethylene material in the range of 0.010 to 0.050 inches in thickness when in form of the unshrunken sleeve.

4. The method of forming an encircling polyethylene covering on the exterior surface of a container article comprising:
 conveying containers in succession in a first path with their longitudinal axes perpendicular to the direction of movement,
 moving hollow sleeves of a heat shrinkable polyethylene material in a separate, second path spaced from the containers, a portion of the second path being in spaced registry with the first path so that the axes of the sleeves are substantially in coaxial alignment with the axes of said containers, the sleeves having an interior cross dimension slightly larger than the exterior cross dimension of said containers,
 telescopically transferring the sleeves over the respective containers during their respective movements in said first and second paths by movement of the sleeves in the coaxial direction to a position whereat the sleeve is placed over the article for movement with the latter in the first path,
 conveying the transferred sleeves and containers together in said first path to a heating device spaced from said second path and then into and through said heating device in said first path,
 supporting the sleeves in position on the containers by conveying them over a support bar device extending along a portion of the first path from adjacent the second path to and into the heating device,
 cooling the support bar device to a temperature under 200° F by applying a liquid coolant thereto,
 applying heat to the sleeves during travel through said heating device sufficient to shrink them into a snug, surface conforming relationship on said containers, said sleeve supporting device extending along said first path at least to the extent the sleeves are shrunken firmly onto the containers.

5. The method of claim 4, wherein the support bar device is maintained under 200° F by internally circulating a liquid coolant therethrough.

6. The method of claim 5, wherein the support bar device provides a low coefficient of friction on its surface engaging the sleeves.

7. The method of claim 6, wherein the said surface engaging the sleeves includes a layer of Teflon thereon.

* * * * *